Feb. 7, 1950 — V. LUNDELL — 2,496,350
TRAILER DUMP
Filed Aug. 11, 1945 — 3 Sheets-Sheet 1

Inventor
VERNON LUNDELL

By Clarence A. O'Brien
and Harvey B. Jacobson
Attorneys

Feb. 7, 1950 V. LUNDELL 2,496,350
TRAILER DUMP
Filed Aug. 11, 1945 3 Sheets-Sheet 2
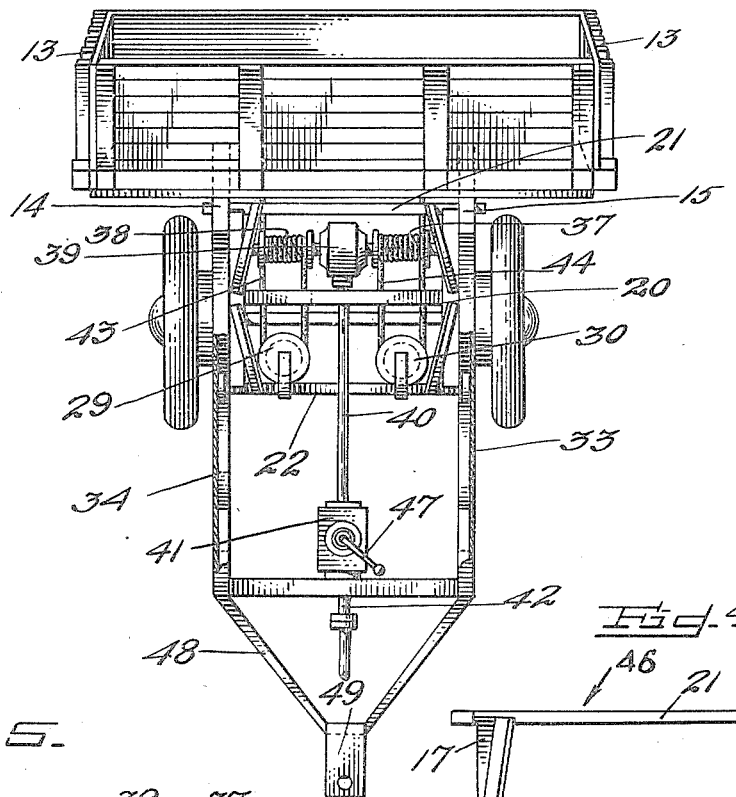
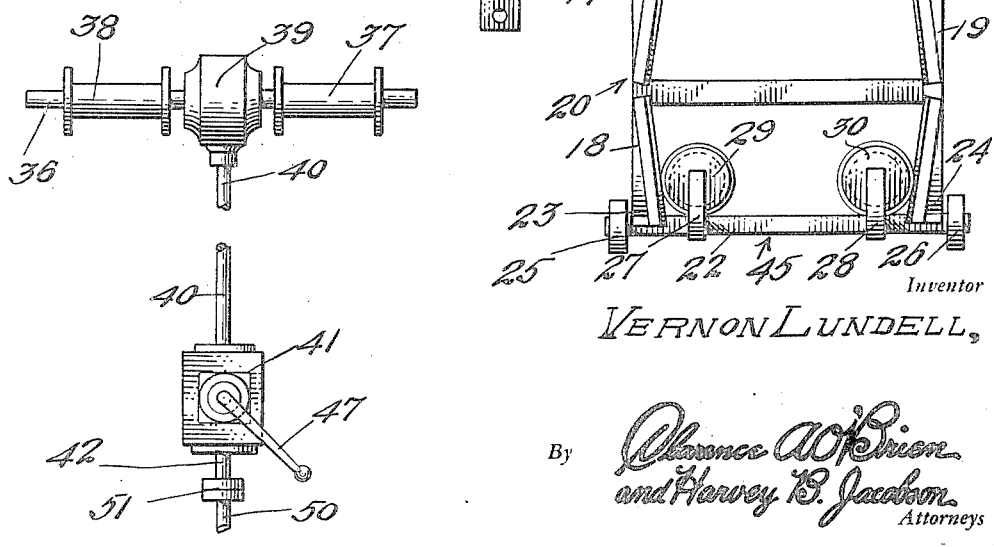

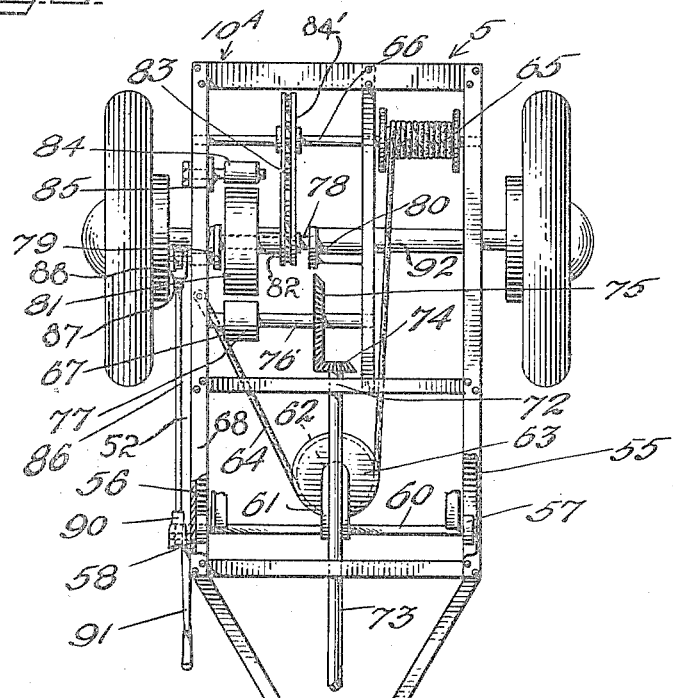

Patented Feb. 7, 1950

2,496,350

UNITED STATES PATENT OFFICE 2,496,350

TRAILER DUMP

Vernon Lundell, Meriden, Iowa

Application August 11, 1945, Serial No. 610,296

22 Claims. (Cl. 298—21)

This invention relates to trailers and has for an object to provide a trailer having a dump body.

Another object of the invention is to provide in a trailer a mechanically operated dump body.

A further object of my invention is to provide in a trailer a dump body and means actuated from the power take-off of a tractor for dumping the body.

An important purpose of this invention is to provide a trailer including a dump body and frictional means whereby the body may be actuated.

One object of my invention is to provide a trailer having a dump body power means for actuating the body and friction means for controlling the speed of the body movement.

Another object of the invention is to provide in a trailer, a dump body including a body operating mechanism and means whereby the speed of movement of the mechanism is controlled from the trailer.

A still further object of the invention is to provide in a trailer a power driven shaft through means of which a body carried by the trailer may be raised and lowered in order to dump the same.

Other features and advantages will become more readily apparent from the following description and the accompanying illustrative drawings in which:

Figure 3 is a top plan view of the device, the body being shown in raised position, Figure 4 is a detail plan view of a body actuating member, Figure 5 is a detail of a winch and drive mechanism therefor, Figure 6 is a plan view of a modification of the invention, and Figure 7 is a side elevational view thereof.

Figure 1:
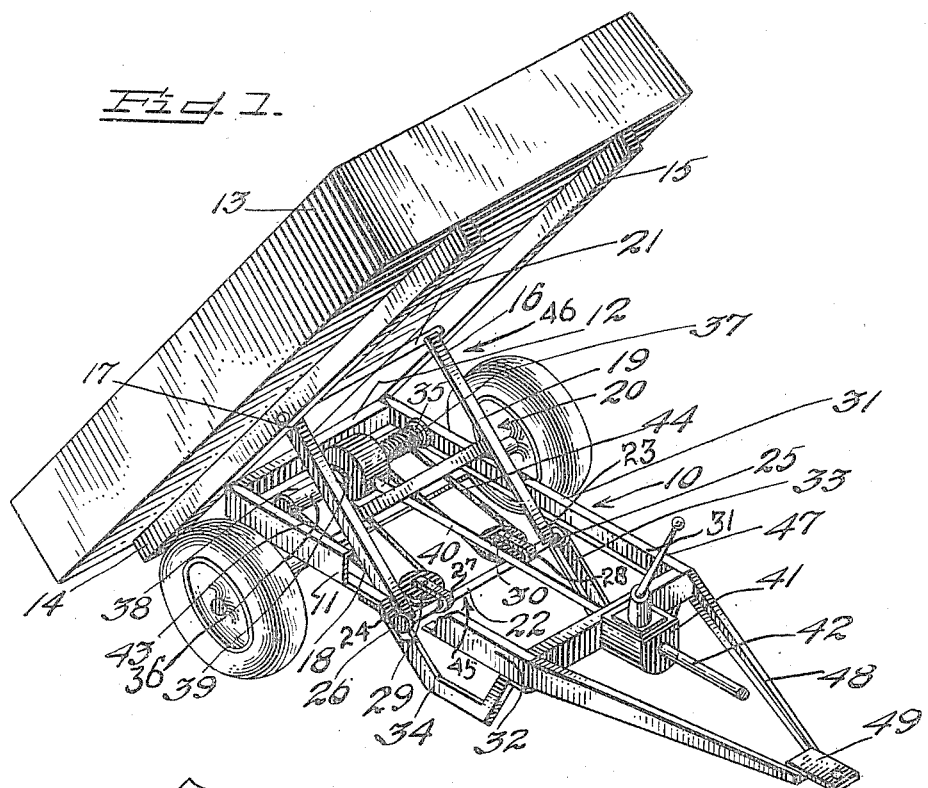
Figure 1 is a perspective view of my dump body trailer.
Figure 2:
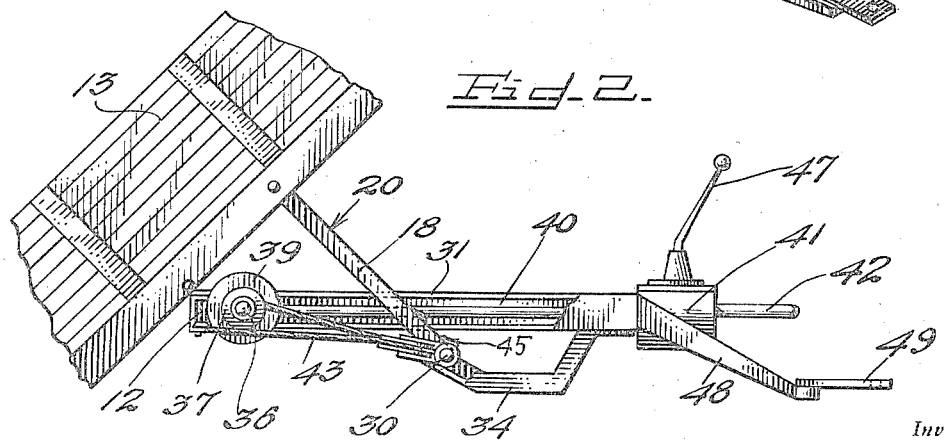
Figure 2 is a broken away side elevational view thereof.

In the drawings and following specification like parts are designated by like references and 10, 10A, indicate two forms of my dump body trailer. The form 10 comprises a chassis 11, to the rear frame member 12, of which is pivotally attached a dump body 13, provided with spaced apart longitudinal timbers 14 and 15.

Forward of the longitudinal center of the members 14 and 15, the ends 16 and 17, of the side elements 18 and 19, of a body control member 20, are pivotally connected by means of the head cross bar 21. On the ends of the foot cross bar 22, to which the lower ends 23 and 24, of members 18 and 19, are secured, wheels 25 and 26, are mounted. Also secured to the bar 22, intermediate thereof but suitably spaced apart by straps 27 and 28, are sheaves 29 and 30, the function of which will presently be stated.

Secured to the side frame members 31 and 32, of the chassis 11, are a pair of oppositely disposed angle iron tracks 33 and 34, which are substantially U-shaped and which depend approximately ten inches below the said members 31 and 32. It is upon these tracks that the wheels 25 and 26, operate.

Mounted in bearings 35, near the rear ends of members 31 and 32, is a shaft 36, upon which is keyed a pair of spaced apart winches 37 and 38, between which, in the casing 39, are gears (not shown) one of which is keyed to the shaft 36, and the other of which is fixed on a drive shaft 40, extending into and connected with the transmission gears (not shown) in the casing 41, which latter gears have connection with the shaft 42.

To each of the winches 37 and 38, are secured both ends of the cables 43 and 44, which cables are looped over the respective sheaves 29 and 30, whereby when the shaft is driven in one direction the cables will be wound around the winches, thus drawing the end 45, of member 20, rearwardly along said tracks 33 and 34, causing the upper end 46, of member 20, to push up and overbalance the body 13, to dump the same. Upon reversing said shaft 36, the cables are unwound, permitting the body to seat itself upon the chassis by gravity. The speed of both raising and lowering the body is controlled through the gear actuating lever 47.

The drawbar 48, of the chassis 11, is provided with a terminal hitch plate 49, for connecting the chassis to a tractor. The shaft 42, may be connected to a power take-off shaft 50, by means of a clutch or a universal joint 51, whereby power is transmitted to the body dumping mechanism of the chassis.

It is obvious that I may use either one or two winches for operating the dump body depending upon the weight of the body, etc. It is also obvious that I may use either bevel or worm gears for driving shaft 36.

In Figures 6 and 7, I illustrate a modification of my invention in which 10A indicates the modified form of the invention and which consists of a chassis 52, to the end 53, of which is hinged a dump body 54, and having depending tracks 55 and 56, upon which the wheels 57, and 58, of the body raising device 59, operate. Attached to the axle 60, upon said wheels 57 and 58, is a clevis 61, to which is pivotally connected by a pin 62 (shown dotted in Figure 6) a grooved pulley wheel or sheave 63, over which a cable 64 operates.

One end of this cable is attached to a winch 65, splined to a shaft 66, and the other end 67, of which is fixedly connected to the frame member 68, of the chassis, adjacent its rear end. One end 69, of the device 59, is pivotally connected, as at 70, to the forward portion 71, of said body 54.

To the end 72, of a power shaft 73, is splined a small bevel gear or pinion 74, meshed with a larger like gear 75, fixed on a shaft 76, upon which shaft is also fixed a small friction pulley 77. Fixedly mounted upon a shaft 78, supported by fixed cranks 79 and 80, is a large friction pulley or drum 81. Fixed to a shaft 78, is a sprocket 82, connected by a sprocket chain 83, to a sprocket wheel 84', fixed on said shaft 66.

The arms 79 and 80, are so arranged that their shaft 78, may be thrown forwardly to throw the pulley 81, into frictional engagement with the pulley 77, whereby pulley 81, and its shaft 78, will be rotated to drive chain 83, and through it the shaft 66, thus operating the winch 65, winding thereon cable 64, and drawing the shaft 69, of the device 59, rearwardly upon the tracks 55 and 56, causing said member 59, to raise the forward end 71, of the body 54, to dump the same.

In order to retard the movement of the body 54, in either direction, the shaft 78, is swung rearwardly bringing pulley 81, into contact with a cam or fixed member 84, on a stub shaft 85, fixed to said member 68. The movement of the shaft 78, is controlled by a link rod 86, the connection 87, of which is pivotally connected to a crank arm 88, projecting out from the crank 79, the forward end 89, of the rod 86, being pivoted to the crank 90, to one end of which a hand lever 91, is fixed through which lever the shaft 78, may be properly controlled. Through reversing the shaft 73, then the shafts 76, 78, 66 and winch 65, will be reversed in action, releasing the cable 64, and permitting the device 59, to roll back to its lowermost position through the gravity action of the forward part of the body 54. The crank 89, is pivoted to a stub shaft 92, on the arm.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. In a dump truck, a chassis, a body hinged thereto, means for dumping the body and a friction pulley through which said means is actuated, a swinging shaft upon which the pulley is mounted, a driver pulley against which the first pulley is adapted to be swung, a friction member against which the first pulley is adapted to be swung, and a hand lever for swinging said pulley.

2. In a dump truck, a chassis, a body hinged thereto, means for dumping the body and a friction pulley through which said means is actuated, a swinging shaft upon which the pulley is mounted, a driver pulley against which the first pulley is adapted to be swung, and a friction member against which the first pulley is adapted to be swung and means for swinging said pulley into engagement with said driver pulley.

3. A dump truck comprising a chassis having a body movably connected therewith, a laterally displaceable shaft attached to said chassis, a drum secured to said shaft, a power shaft associated with said chassis, a pulley and means rotatively mounting said pulley on said chassis, said laterally displaceable shaft being movable for engagement of said drum and said pulley, means for drivingly connecting said pulley and said power shaft and means attached to said body and actuated by said drum for displacing said body, and a member attached to said chassis for cooperation with said drum to form a brake and hold said body in selected positions.

4. A dump truck comprising a chassis having a body movably connected therewith, a laterally displaceable shaft attached to said chassis, a drum secured to said shaft, a power shaft associated with said chassis, a pulley and means rotatively mounting said pulley on said chassis, said shaft being movable to a position so that said drum is in driving engagement with said pulley, means for drivingly connecting said pulley and said power shaft and means attached to said body and actuated by said drum for displacing said body, said body displacing means including a shaft having a second drum and mounted for rotation in said chassis, a flexible member attached to said second drum and anchored to said chassis, a sheave engaged by said flexible member, a rod attached to said sheave, means for connecting said rod to said body.

5. A dump truck comprising a chassis having a body movably connected therewith, a shaft laterally displaceable shaft attached to said chassis, a drum secured to said shaft, a power shaft associated with said chassis, a pulley and means rotatively mounting said pulley on said chassis, said shaft being displaceable to such position that said drum engages said pulley, means for drivingly connecting said pulley and said power shaft and means attached to said body and actuated by said drum for displacing said body, said body displacing means including a shaft having a second drum and mounted for rotation in said chassis, a flexible member attached to said second drum and anchored to said chassis, a sheave engaged by said flexible member, a rod attached to said sheave, means for connecting said rod to said body, a track attached to said chassis carrying said rod, and said last mentioned means comprising at least one arm connected with said rod and associated with said body.

6. A dump truck comprising a chassis having a body movably connected therewith, a laterally displaceable shaft attached to said chassis, a drum secured to said shaft, a power shaft associated with said chassis, a pulley and means rotatively mounting said pulley on said chassis, said shaft being displaceable to such position that said drum engages said pulley, means for drivingly connecting said pulley and said power shaft and means attached to said body and actuated by said drum for displacing said body, said body displacing means including a shaft having a second drum and mounted for rotation in said chassis, a flexible member attached to said second drum and anchored to said chassis, a sheave engaged by said flexible member, a rod attached to said sheave, means for connecting said rod to said body, and a member attached to said chassis for cooperation with said drum to form a brake and hold said body in selected positions.

7. A dump truck comprising a chassis having a body movably connected therewith, a laterally displaceable shaft attached to said chassis, a drum secured to said shaft, a power shaft associated with said chassis, a pulley and means rotatively mounting said pulley on said chassis, said shaft being displaceable to such position that said drum engages said pulley, means for drivingly connecting said pulley and said power shaft and means attached to said body and actuated by said drum for displacing said body, said body displacing means including a shaft having a second drum and mounted for rotation in said chassis, a flexible member attached to said second drum and anchored to said chassis, a sheave engaged by said flexible member, a rod attached to said sheave, means for connecting said rod to said body, a track attached to said chassis carrying said rod, and said last mentioned means comprising at least one arm connected with said rod and associated with said body, and a member attached to said chassis for cooperation with said drum to form a brake and hold said body in selected positions.

8. In a vehicle including a chassis with wheels attached thereto, a body pivotally secured to said chassis, a swingingly mounted shaft on said chassis, a drum attached to said shaft, a pulley adjacent said drum and means rotatively mounting said pulley on said chassis, means associated with said last mentioned means for actuating said pulley, said swingingly mounted shaft being positionable in contacting relation with said pulley, a countershaft journalled in said chassis, a reel secured to said countershaft, means for drivingly connecting said countershaft and said swingingly mounted shaft, and means including a flexible member for transmitting rotative movement of said reel to pivotal movement of said body.

9. In a vehicle including a chassis with wheels attached thereto, a body pivotally secured to said chassis, a swingingly mounted shaft on said chassis, a drum attached to said shaft, a pulley adjacent said drum and means rotatively mounting said pulley on said chassis, means associated with said last mentioned means for actuating said pulley, said swingingly mounted shaft being positionable in contacting relation with said pulley, a countershaft journalled in said chassis, a reel secured to said countershaft, means for drivingly connecting said countershaft and said swingingly mounted shaft, and means including a flexible member for transmitting rotative movement of said reel to pivotal movement of said body, said transmitting means including an arm pivoted to said body motivated by said flexible member and means for limiting the travel of said arm.

10. In a vehicle including a chassis with wheels attached thereto, a body pivotally secured to said chassis, a swingingly mounted shaft on said chassis, a drum attached to said shaft, a pulley adjacent said drum and means rotatively mounting said pulley on said chassis, means associated with said last mentioned means for actuating said pulley, said swingingly mounted shaft being positionable in contacting relation with said pulley, a countershaft journalled in said chassis, a reel secured to said countershaft, means for drivingly connecting said countershaft and said swingingly mounted shaft, and means including a flexible member for transmitting rotative movement of said reel to pivotal movement of said body, said transmitting means including an arm pivoted to said body motivated by said flexible member and means for limiting the travel of said arm, said travel limiting means including a track attached to said chassis, a rod attached to said arm and a friction reducing element attached to said rod engaging said track.

11. In a vehicle including a chassis with wheels attached thereto, a body pivotally secured to said chassis, a swingingly mounted shaft on said chassis, a drum attached to said shaft, a pulley adjacent said drum and means rotatively mounting said pulley on said chassis, means associated with said last mentioned means for actuating said pulley, said swingingly mounted shaft being positionable in contacting relation with said pulley, a countershaft journalled in said chassis, a reel secured to said countershaft, means for drivingly connecting said countershaft and said swingingly mounted shaft, and means including a flexible member for transmitting rotative movement of said reel to pivotal movement of said body, said transmitting means including an arm pivoted to said body motivated by said flexible member and means for limiting the travel of said arm, said travel limiting means including a track attached to said chassis, a rod attached to said arm and a friction reducing element attached to said rod engaging said track, a relatively stationary member attached to said chassis and within the travel of said swingingly mounted arm for frictional engagement with said drum to lock the body in selected positions.

12. The combination of claim 8 and means secured to said chassis and engageable with said drum for locking said drum thereby maintaining said body in selected positions.

13. The combination of claim 9 and means secured to said chassis and engageable with said drum for locking said drum thereby maintaining said body in selected positions.

14. In a vehicle including a chassis with wheels attached thereto, a body pivotally secured to said chassis, a swingingly mounted shaft on said chassis, a drum attached to said shaft, a pulley adjacent said drum and means rotatively mounting said pulley on said chassis, means associated with said last mentioned means for actuating said pulley, said swingingly mounted shaft being positionable in contacting relation with said pulley, a countershaft journalled in said chassis, a reel secured to said countershaft, means for drivingly connecting said countershaft and said swingingly mounted shaft, and means including a flexible member for transmitting rotative movement of said reel to pivotal movement of said body, said pulley actuation means including a power shaft journalled in said chassis and having a gear attached thereto, and means engaging said gear for driving said drum.

15. In a vehicle including a chassis with wheels attached thereto, a body pivotally secured to said chassis, a swingingly mounted shaft on said chassis, a drum attached to said shaft, a pulley adjacent said drum and means rotatively mounting said pulley on said chassis, means associated with said last mentioned means for actuating said pulley, said swingingly mounted shaft being positionable in contacting relation with said pulley, a countershaft journalled in said chassis, a reel secured to said countershaft, means for drivingly connecting said countershaft and said swingingly mounted shaft, and means including a flexible member for transmitting rotative movement of said reel to pivotal movement of said body, and means for swinging said swingingly mounted shaft.

16. In a vehicle including a chassis with wheels attached thereto, a body pivotally secured to said chassis, a swingingly mounted shaft on said chassis, a drum attached to said shaft, a pulley adjacent said drum and means rotatively mounting said pulley on said chassis, means associated with said last mentioned means for actuating said pulley, said swingingly mounted shaft being positionable in contacting relation with said pulley, a countershaft journalled in said chassis, a reel secured to said countershaft, means for drivingly connecting said countershaft and said swingingly mounted shaft, and means including a flexible member for transmitting rotative movement of said reel to pivotal movement of said body, said transmitting means including an arm pivoted to said body motivated by said flexible member and means for limiting the travel of said arm, said travel limiting means including a track attached to said chassis, a rod attached to said arm and a friction reducing element attached to said rod engaging said track, a relatively stationary member attached to said chassis and within the travel of said swingingly mounted arm for frictional engagement with said drum to lock the body in selected positions, and manually operative means for swinging said swingingly mounted shaft into selected positions to frictionally contact said pulley and said stationary member to energize said swinging shaft and to lock said swinging shaft.

17. In a vehicle, a chassis having a body hingedly secured thereto, a laterally displaceable shaft having a drum secured thereto associated with said chassis, a power shaft and a pulley actuated by said power shaft, means for displacing said first mentioned shaft to contact said pulley, and means for transferring rotative movement of said drum when contacting said pulley to hinged movement of said body.

18. In a vehicle, a chassis having a body hingedly secured thereto, a laterally displaceable shaft having a drum secured thereto associated with said chassis, a power shaft and a pulley actuated by said power shaft, means for displacing said first mentioned shaft to contact said pulley, and means for transferring rotative movement of said drum when contacting said pulley to hinged movement of said body, said last mentioned means including a rod attached at one end to said body, a track attached to said chassis having said rod movably received therein and a flexible member wound by movement of said drum and attached to said rod.

19. In a vehicle, a chassis having a body hingedly secured thereto, a laterally displaceable shaft having a drum secured thereto associated with said chassis, a power shaft and a pulley actuated by said power shaft, means for displacing said first mentioned shaft to contact said pulley, and means for transferring rotative movement of said drum when contacting said pulley to hinged movement of said body, said last mentioned means including a rod attached at one end to said body, a track attached to said chassis having said rod movably received therein and a flexible member wound by movement of said drum and attached to said rod, a stationary element attached to said chassis engageable by said drum to frictionally lock said drum in selected positions.

20. The combination of claim 19 and manual means for displacing said first mentioned shaft.

21. In a vehicle, a chassis having a body hingedly secured thereto, a laterally displaceable shaft having a drum secured thereto associated with said chassis, a rotatable pulley carried by said chassis, said shaft being displaceable to such position that said drum engages said pulley, a stationary element attached to said chassis, means actuated by said drum while it is in contact with said live pulley for hingedly moving said body.

22. In a vehicle, a chassis having a body hingedly secured thereto, a laterally displaceable shaft having a drum secured thereto associated with said chassis, a rotatable pulley carried by said chassis, a stationary element attached to said chassis, said shaft being displaceable to such position that said drum engages said pulley, means actuated by said drum while it is in contact with said live pulley for hingedly moving said body, said stationary element and live pulley flanking said drum whereby by displacement of said laterally displaceable shaft frictional engagement results selectively with said live pulley and said stationary element.

VERNON LUNDELL.

REFERENCES CITED

The following references are of record in the file of this patent:

UNITED STATES PATENTS

| Number | Name | Date |
|---|---|---|
| 1,334,375 | Hugg | Mar. 23, 1920 |
| 1,606,412 | Graham | Nov. 9, 1926 |
| 2,034,306 | Lowdermilk | Mar. 17, 1936 |

FOREIGN PATENTS

| Number | Country | Date |
|---|---|---|
| 23,634 | Great Britain | Oct. 1, 1903 |